(12) United States Patent
Dufort et al.

(10) Patent No.: US 9,073,259 B2
(45) Date of Patent: Jul. 7, 2015

(54) MEDIA-BASED SYSTEM FOR FORMING THREE-DIMENSIONAL OBJECTS

(75) Inventors: Ron Edward Dufort, Rochester, NY (US); Frank Albert Porter, Penfield, NY (US); Venkata Bharadwaj Chivukula, Webster, NY (US); Aaron Michael Moore, Fairport, NY (US); Adam Douglas Ledgerwood, Geneva, NY (US)

(73) Assignee: Xerox Corporation, Norwalk, CT (US)

( * ) Notice: Subject to any disclaimer, the term of this patent is extended or adjusted under 35 U.S.C. 154(b) by 639 days.

(21) Appl. No.: 13/306,447

(22) Filed: Nov. 29, 2011

(65) Prior Publication Data

US 2013/0138234 A1    May 30, 2013

(51) Int. Cl.
G06F 19/00    (2011.01)
B29C 67/00    (2006.01)
G06T 19/00    (2011.01)

(52) U.S. Cl.
CPC ............. *B29C 67/0051* (2013.01); *G06T 19/00* (2013.01); *G06T 2219/008* (2013.01)

(58) Field of Classification Search
USPC .............. 700/98, 115, 118, 119; 358/1.1, 1.6; 156/60, 64; 428/195.1; 345/420; 382/154
See application file for complete search history.

(56) References Cited

U.S. PATENT DOCUMENTS

| | | | | |
|---|---|---|---|---|
| 6,506,477 | B1 * | 1/2003 | Ueda et al. | 428/195.1 |
| 7,589,868 | B2 * | 9/2009 | Velde et al. | 358/3.3 |
| 2004/0247174 | A1 * | 12/2004 | Lyons et al. | 382/154 |
| 2006/0221072 | A1 * | 10/2006 | Se et al. | 345/420 |
| 2007/0146734 | A1 * | 6/2007 | Taniuchi et al. | 358/1.1 |
| 2007/0285420 | A1 * | 12/2007 | Brown | 345/420 |
| 2010/0098328 | A1 * | 4/2010 | Se et al. | 382/154 |
| 2011/0222081 | A1 | 9/2011 | Yi et al. | |
| 2012/0177284 | A1 * | 7/2012 | Wang | 382/154 |
| 2012/0255663 | A1 | 10/2012 | Holroyd et al. | |
| 2012/0306876 | A1 * | 12/2012 | Shotton et al. | 345/424 |

\* cited by examiner

*Primary Examiner* — Robert Fennema
*Assistant Examiner* — Anthony Whittington
(74) *Attorney, Agent, or Firm* — Hoffmann & Baron, LLP

(57) ABSTRACT

Embodiments described herein are directed to generating physical three-dimensional color-accurate objects based on a 3D computer-based color model using printed layers of media. Embodiments can slice a 3D computer-based color model into 3D cross-sectional components, which retain the color information of the model. The 3D cross-sectional segments can be converted into 2D page images and the color information can be included in a plan image corresponding to the cross-sectional segments. Embodiments can print the page images to form cross-sectional prints which can be layered and trimmed to shape the prints into a color accurate physical object that represents the model.

19 Claims, 5 Drawing Sheets

MEDIA-BASED SYSTEM FOR FORMING THREE-DIMENSIONAL OBJECTS

BACKGROUND

1. Technical Field

The presently disclosed embodiments are directed to generating physical three-dimensional (3D) color-accurate objects based on a 3D computer-based model using layers of media.

2. Brief Discussion of Related Art

Sheet-based three-dimensional (3D) printers use adhesive and layers of media such as paper or mylar to build physical objects from 3D computer-based models faster and at a lower cost than other conventional rapid prototyping machines (e.g. stereolithography, selective laser sintering, fused deposition modeling). In sheet-based 3D printers, media layers are adhered to preceding layers and trimmed correlating to cross-sections of a source computer-based model, building up the physical model as layers are added. Very complex objects can be built with these printers, but the objects are typically a single color (the color of the source media). A "topological map" appearance can be achieved by using a different color of media for each layer, however the colors are independent of the source computer-based model. Conventional sheet-based 3D printing systems do not utilize the color properties of the source computer-based models, and therefore, typically do not form color-accurate physical renderings of those models.

SUMMARY

According to aspects illustrated herein, there is provided a method for forming a physical object from a three-dimensional (3D) computer-based model. The method includes forming page images for a 3D computer-based model. The page images correspond to cross-sectional segments of the 3D computer-based model. The model includes an image color that is different than a media color to be used to form the physical object. The method further includes incorporating the image color into the page images based on a location of the image color in the model. The page images are configured to be printed on media to form cross-sectional prints from which the physical object is formed.

According to other aspects illustrated herein, there is provided a system for forming a physical object from a three-dimensional (3D) computer-based model. The system includes a processing device and a media printing system. The processing device forms page images for a 3D computer-based model and incorporates the image color into the page images based on a location of the image color in the model. The page images correspond to cross-sectional segments of the 3D computer-based model. The 3D computer-based model includes an image color that is different than a media color to be used to form the physical object. The media printing system prints the pages images on media to form cross-sectional prints from which the physical object is formed.

According to further aspects illustrated herein, there is provided a non-transitory computer readable medium storing instructions executable by a processing device, wherein execution of the instructions implements a method for forming a physical object from a three-dimensional (3D) computer-based model. The method implemented by execution of the instructions includes forming page images for a 3D computer-based model. The page images corresponding to cross-sectional segments of the 3D computer-based model, the model including an image color that is different than a media color to be used to form the physical object. The method implemented by execution of the instructions further includes incorporating the image color into the page images based on a location of the image color in the model. The pages images are configured to be printed on media to form cross-sectional prints from which the physical object is formed.

DETAILED DESCRIPTION

Figure 1:
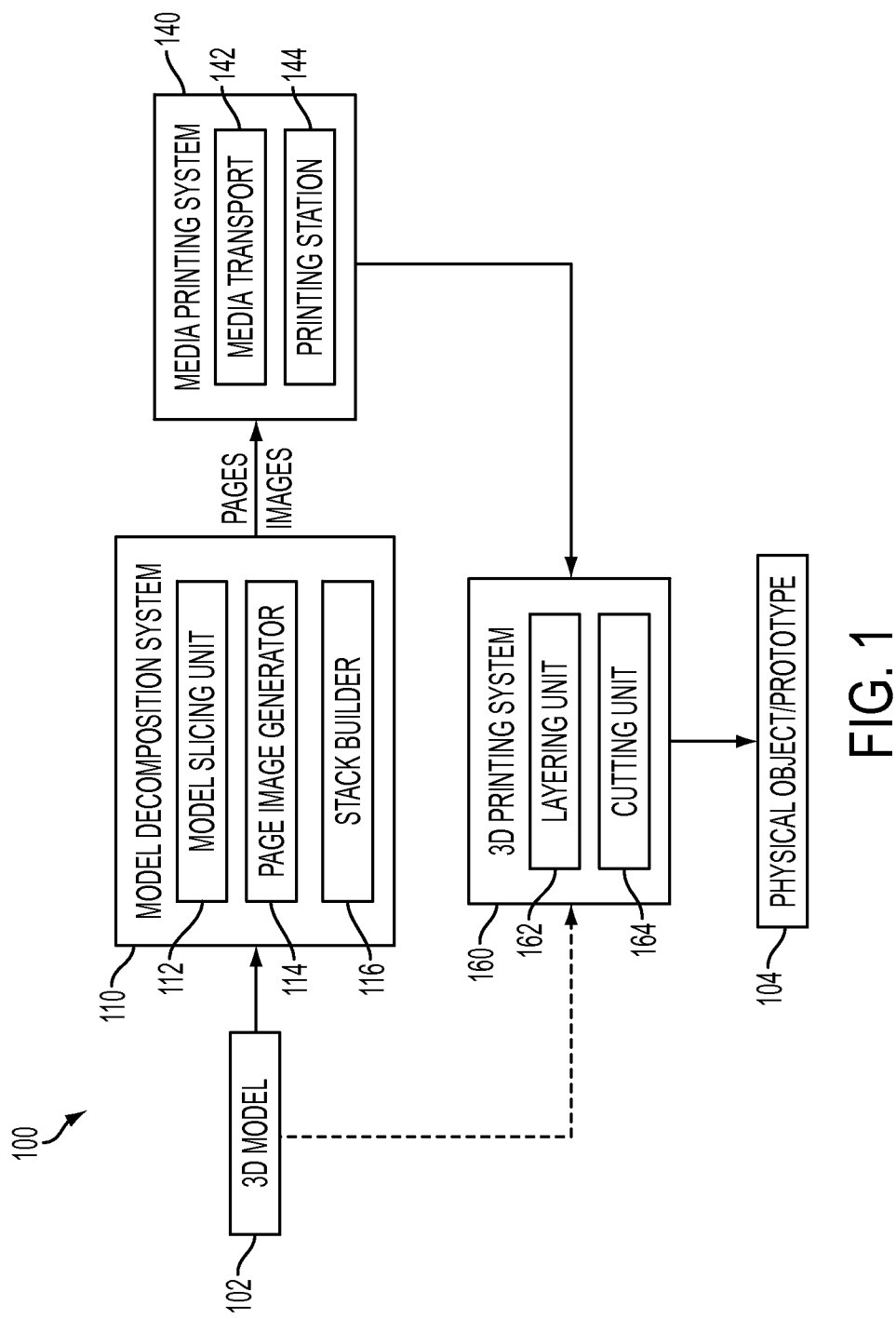
FIG. 1 depicts a block diagram of an exemplary color-enabled three-dimensional (3D) object generation system.

Exemplary embodiments included are directed to using color information embedded in a three-dimensional (3D) computer-based model in a computing environment to generate a color-accurate physical rendering of the model using a sheet-based 3D object generation system. Embodiments can slice a 3D computer-based color model into 3D cross-sectional components, which retain the color information of the model. The 3D cross-sectional segments can be converted into 2D page images. The color associated with the model can be included in the page images based on the location of the color in the model. Embodiments can print the page images to form cross-sectional prints which can be layered and trimmed to shape the resulting stack of prints into a physical object that represents the model. The surface of the physical object can include color corresponding to the model passed through to the prints to create a color accurate rendering of the model.

As used herein, "two-dimensional" or "2D" refers to having or seeming to have any two of height, width, and depth.

As used herein, "three-dimensional" or "3D" refers to having or seeming to have depth as well as height and width.

As used herein, a "3D computer-based model" or "model" refers to a mathematical representation of three-dimensional features of an object generated in a computing environment using for example, a computer aided design (CAD) environment or other modeling environment, having or appearing to have three dimensions.

As used herein, a "cross-sectional segment" refers to a 3D portion of a model that has been sliced from the model by a plane cutting through a model.

As used herein, an "image" refers to visual representation, such as a picture, photograph, computer document including text, graphics, pictures, and/or photographs, and the like, that can be rendered by a display device and/or printed on media.

As used herein, "plan image" refers to an image which in general resides on a plane and represents a top view or cross-section view of said plane.

As used herein, a "page image" refers to an image representing a sheet to be printed as a cross-sectional print.

As used herein, a "location" refers to a spatial position with respect to reference point or area.

As used herein, "media" refers to a tangible medium, such as paper (e.g, a sheet of paper, a long web of paper, a ream of paper, etc.), transparencies, parchment, film, fabric, plastic, or other substrates on which an image can be printed or disposed.

As used herein, "cross-sectional prints" refer to a sheet of media on which a page image is disposed and which is used as a layer to form a physical object or prototype of a computer-based model.

As used herein, "color-accurate" refers to the property of a physical object or prototype whereby the colors of the object correlate to the colors of the model on which the physical object or prototype is based.

As used herein, "rendering" refers to a depiction, representation, copy or reproduction of an object or thing which may exist either physically or virtually.

As used herein, "slicing" refers to dividing, partitioning, and/or separating into two-dimensional segments such as by the manipulation or reorganization of data to create said segments.

As used herein, "dimension" refers to a measurable property of an object or thing, such as a height or width.

As used herein, "quantity" refers to a number or amount.

As used herein, "stack" refers to an ordered pile or sequence, such as a pile of sheets of media or a sequence of page images to be printed or that has been printed.

As used herein, "background layer" refers to component of a page image on which a plan image is disposed.

As used herein, "layers" refer to elements or components of a stack.

As used herein, "trimming" or "cutting" refers to severing, tearing, physically dividing, and the like.

As used herein, a "trim path" refers to a route over which an object is cut or trimmed.

As used herein, a "processing device" refers to a controller or processor that executes instructions to implement a process, procedure, computation, and the like.

As used herein, a "media printing system" refers to a device, machine, apparatus, and the like, for forming images on substrate media using ink, toner, and the like, and a "multicolor printing system" refers to a printing system that uses more than one color (e.g., red, blue, green, black, cyan, magenta, yellow, clear, etc.) ink or toner to form an image on substrate media. A "printing system" can encompass any apparatus, such as a printer, digital copier, bookmaking machine, facsimile machine, multi-function machine, etc. which performs a print outputting function. Some examples of printing systems include Xerographic, Direct-to-Paper (e.g., Direct Marking), modular overprint press (MOP), ink jet, solid ink, as well as other printing systems.

As used herein, a "3D printing system" refers to a device, machine, apparatus, and the like, for forming physical objects or prototypes by layering and trimming sheets of media.

As used herein, a "non-transitory computer readable medium", "computer readable medium", or "storage device" refers to a device for storing information and can be implemented using, for example, a floppy drive, hard drive, compact disc, tape drive, Flash drive, optical drive, read only memory (ROM), random access memory (RAM), and the like.

FIG. 1 depicts a block diagram of a color-enabled three-dimensional (3D) object generation system 100 (hereinafter "system 100"). The system can include a model decomposition system 110, a media printing system 140, and a 3D object printing system 160 (hereinafter "system 160"). The system 100 can process a computer generated 3D model 102, such as a model generated using computer aided design (CAD) software, and can generate a physical object 104 corresponding to the model 102 using layers of trimmed substrate media. The system 100 facilitates color specific object generation so that the object 104 includes colors corresponding to colors included in the model 102. The sheets in a source stack of media are printed using a color printer. Color information embedded in the 3D model is printed on the prints based on the layer of the prototype that the print will be used to construct. When the page is trimmed along a trim path, the trimmed edge will reveal the color, resulting in a full-color 3D prototype. Embodiments of the system 100 can provide users with a substrate media layer based object generation process to generate objects that are true not only to the shapes and dimensions of the 3D model, but also to the colors of the 3D model.

The model decomposition system 110 can include a model slicing unit 112, a page image generator 114 (hereinafter "generator 114"), and a stack builder 116. The system 110 can receive a 3D model 102, represented as a model file, and can divide the 3D model into uniform slices creating cross-sectional segments of the 3D model. The cross-sectional segments of the model can be used to generate page images that can be grouped to form a stack of page images. The model 102 can be sliced based on a thickness of the media used to form the object. The stack builder 116 can generate an ordered virtual stack of page images. The ordered stack can correspond to an order in which the pages images are to be printed. Color information of the 3D model can be retained in the cross-sectional segments and included in the page images. In some embodiments, the colors of the perimeters of the cross-sectional segments are retained, while the interior portions of the cross-sectional components that will not be visible when the object is built are omitted. These embodiments can reduce the amount of memory used to store the page images corresponding the cross-sectional segments and can reduce the amount of ink/toner required when the page images are printed.

Software splits a 3D CAD model into layers that correspond to the pages that the 3D-printer uses to build the physical model. Color information embedded in the CAD model is transferred onto each layer/page so that each page can be printed with the color at the edge that will be trimmed. A stack of pages is then printed with an image on a conventional color printer and then loaded as an ordered stack into the 3D printer. The edge of the stack at the trim is thus the color of the substrate, plus an additional layer of colored toner/ink of the image. This results in a full-color 3D output. Some of the substrate color (generally white) will show, but the color toner is visible—a darker color is possible if two layers of toner/ink are used by printing on both sides of each sheet or using higher area coverage (i.e. thicker toner layers). Ink penetration through the substrate can also reduce the visibility of the substrate color and also result in a darker model.

The model slicing unit 112 can divide the model into cross-sectional segments. The model slicing unit 112 can use one or more parameters when determining the dimensions of the cross-sectional segments and a quantity of cross-sectional segments to be generated. In some embodiments, the model slicing unit 112 can identify dimensions of the object to be built from the model. For example, in some embodiments, the model can have a scaling factor used to correlate the dimensions of the model with the dimensions of the object to be built based on the model. For example, a scale of 1:1 indicates that the model represents the actual size of the object to be built, while a scale 1:2 can indicate that the dimensions of the object to be built are twice that of the model. Using at least one of the dimensions of the object to be built, the model slicing unit can calculate a height for a stack of substrate media necessary to build the object. For example, the model slicing unit 112 can use the dimension that is perpendicular to the direction in which the cross-sectional segments are formed to determine the height of the stack.

The model slicing unit 112 can identify a type and thickness of the substrate media that will be used to generate the object. In some embodiments, the model slicing unit 112 can receive the type of substrate media to be used from a user through a user interface implemented by the system 110. The model slicing unit 112 can include a database of possible types of substrate media and the corresponding thickness of the types of substrate media so that when the type of substrate media is selected, the unit can obtain the thickness of the selected type of substrate media.

Using the information corresponding to the dimensions of the object to be generated and the dimensions of the media, the model slicing unit 112 can determine the number of cross-sectional segments to generate. For example, the model slicing unit 112 can divide the height of the stack of substrate media by the thickness of the substrate media to calculate the number of cross-sectional segments to generate. In some embodiments, the model slicing units can analyze the model to identify identical cross-sectional segments, both in dimensions and color and can group the segments so that a single reusable cross-sectional segment can be generated for each identical cross-sectional segment. This can reduce the total number of cross-sectional segments that are generated; thereby reducing the number of page images to be generated and reducing the amount of storage used. Generating a reusable cross-sectional segment can also reduce the processing time required decompose the model.

The generator 114 can generate page images from cross-sectional segments formed by the model slicing unit 112. The generator 114 can generate page images by flattening the cross-sectional segments of the 3D model into 2D plan images. For example, the generator 114 can generate a page image for each of the cross-sectional segments. The plan images formed by the generator 114 can be set on a background layer corresponding to the media to be used to form the physical object. The plan images can be aligned on the background layers so that when the images are stacked and the background layer is removed, the plan images form a physical rendering of the model from which the plan images were generated.

The generator 114 can retain the color information of the cross-sectional segments in the page images. For example, colors on perimeter surfaces of the cross-sectional segments can be used around the perimeter of the plan images so that an outline of the plan image includes the colors of the perimeter surfaces of the cross-sectional segments. In some embodiments, the generator 114 can extend the color associated with the perimeter of the cross-sectional segments beyond the outline of the plan image so the colors associated with the outline of the plan image are not trimmed away after the plan image is printed and cut.

The printing system 140 can receive the page images from the model decomposition system 110 and can print the print image onto substrate media. The printing system can be implemented as a Xerographic printer, Direct-to-Paper printer (e.g., Direct Marking printer), modular overprint press (MOP) printer, ink jet printer, laser printer, solid ink printer, and the like. The printing system 140 can include a media transport 142 and a printing station 144

The printing system 140 can receive page images from the stack generated by the model decomposition system 110 and can print the page images on substrate media using one or more image colors to form cross-sectional prints or prototype elements corresponding to the cross-sectional segments formed by the decomposition system 110 and portrayed in the page images. The prototype elements are stacked and trimmed using the 3D printing system. The media transport 142 can include belts, rollers or nips, and/or other devices or structures for transporting substrate media through the printing system 140 and passed the printing station 144.

The printing station 144 can include one or more image marking units to dispose one or more marking materials, such as ink or toner, on the substrate media as the substrate media passes through the printing station 144. In some embodiments, the marking units can be implemented using an intermediate transfer belt or drum onto which an image is disposed before being transferred to the substrate media. The image can be transferred from the intermediate transfer belt or drum to the substrate media as the substrate media passes through the printing station. In some embodiments, the image marking units can be implemented as one or more print heads that eject marking material directly on substrate media as the substrate media passes through the printing station.

The 3D printing system 160 can use the cross-sectional prints or prototype elements generated using the printing system 140 to generate a physical 3D object or prototype corresponding to the 3D model. The 3D printing system 160 can include a layering unit 162 and a cutting unit 164. The layering unit 162 can layer the cross-sectional prints operatively coupling adjacent sheets to build a stack of sheets based on a predetermined order. Adjacent sheets can be tacked, bound, adhered, or otherwise connected together by the layering unit 162.

The cutting unit 164 can cut the cross-sectional prints to shape the media to correspond to the shape of the model on which the physical object is based. For example, the cutting unit 164 can receive dimensional information based on the model so that the cutting unit 164 can be configured to cut the cross-sectional prints along trim path associated with the plan images printed on the cross-sectional prints. When the cross-sectional prints are cut to shape by the cutting unit 164, the colors of the plan images appear on the perimeter of the trimmed cross-sectional print. Once the cross-sectional prints are stacked and trimmed to form the physical object, the physical object forms a color accurate rendering of the model such that the colors associated with the model are included on an outer surface of the physical object.

Figure 2:
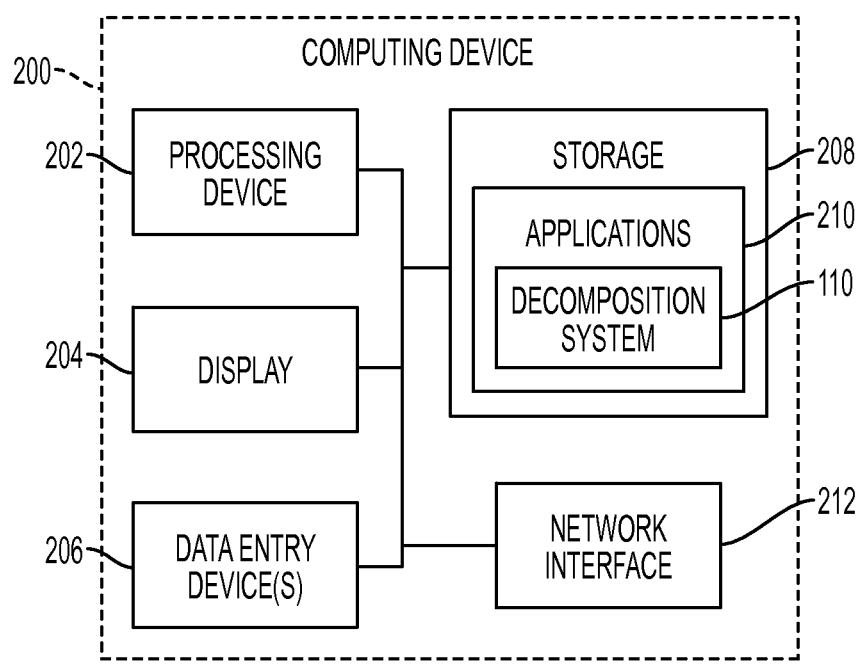
FIG. 2 depicts an exemplary computing device for implementing embodiments of a decomposition system of one embodiment of the color-enabled three-dimensional (3D) object generation system.

FIG. 2 is a block diagram of an exemplary computing device for implementing embodiments of the model decomposition system 110. The computing device 200 can be a mainframe; personal computer (PC); laptop computer; workstation; handheld device, such as a PDA and/or smart phone; and the like. In the illustrated embodiment, the computing device 200 includes a processing device 202 and can include a display device 204. The display device 204 enables the computing device 200 to communicate with an operator through a visual display. The computing device 200 can further include data entry device(s) 206, such as a keyboard, touch screen, microphone, and/or mouse. The computing device 200 can include storage 208 for storing data and instructions. The storage 208 can include computer readable medium technologies, such as a floppy drive, hard drive, compact disc, tape drive, Flash drive, optical drive, read only memory (ROM), random access memory (RAM), and the like.

Applications 210, such as embodiments of the model decomposition system 110, can be resident in the storage 208. The applications 210 can include instructions for implementing the model decomposition system 110. The instructions can be implemented using, for example, C, C++, Java, JavaScript, Basic, Perl, Python, assembly language, machine code, and the like. The storage 208 can be local or remote to the computing device 200. The computing device 200 includes a network interface 212 for communicating with a network. The processing device 202 operates to run the applications 210 in storage 208 by executing instructions therein and storing data resulting from the performed instructions, which may be output via a display 204 or by other mechanisms known to those skilled in the art, such as from printing systems 140 and/or 160.

Figure 3:
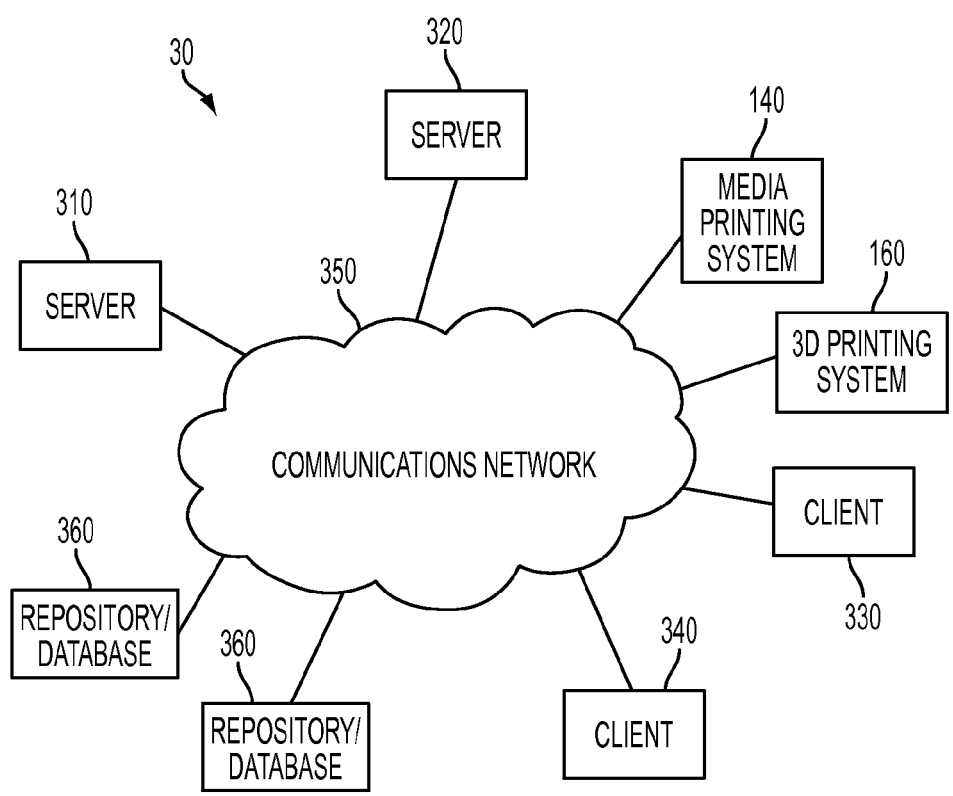
FIG. 3 depicts an exemplary computing system for implementing embodiments of the color-enabled three-dimensional (3D) object generation system in a networked environment.

FIG. 3 is an exemplary computing system for implementing embodiments of the system 100. The computing system 300 includes one or more servers 310 and 320 communicatively coupled to clients 330 and 340, the printing system 140, and the 3D printing system 160, via a communication network 350, which can be any network over which information can be transmitted between devices communicatively coupled to the network. The system 300 can also include repositories or database devices 360, which can be communicatively coupled to the servers 310/320 and clients 330/340 via the communications network 350. The servers 310/320, clients 330/340, and database devices 360 can be implemented as computing devices, such as a computing device implemented in a similar manner as the computing device 200 of FIG. 2.

In some embodiments, the model decomposition system 110 can be distributed among the servers 310/320, clients 330/340, and database devices 360 such that one or more components of the model decomposition system 110 and/or portion of one or more components of the model decomposition system 110 can be implemented by a different device (e.g. clients, servers, databases) in the communication network 350. For example, the model slicing unit 112 and the page image generator 114 can be resident on the server 310 and the stack builder 116 can be resident on the server 320.

Figure 4:
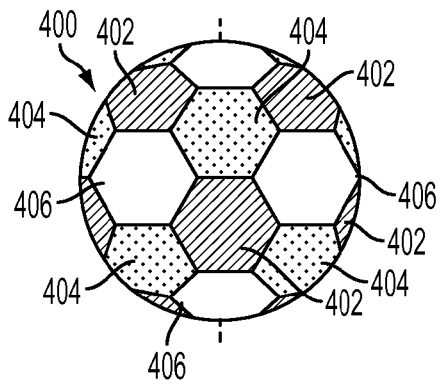
FIG. 4 is an exemplary 3D dimensional model that can be processed by embodiments of a color-enabled three-dimensional (3D) object generation system.

FIG. 4 is an exemplary 3D dimensional model 400 in a computing environment. In the present example, the model 400 is a multi-colored soccer ball having a generally spherical shape. The model 400 can have different colored panels, such as white panels 402, blue panels 404, and black panels 406. The model can be generated using in a computer aided design (CAD) environment.

Figure 5:
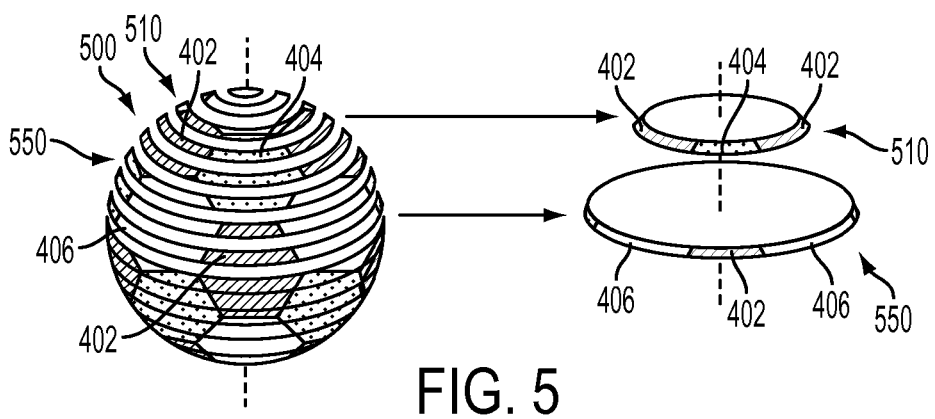
FIG. 5 illustrates exemplary cross-sectional segments of the 3D model of FIG. 4 after being divided into slices.

FIG. 5 illustrates exemplary cross-sectional segments 500 of the 3D model of FIG. 4 after the model slicing unit 112 divides the model into slices. The slicing unit 112 can slice the model 400 into a quantity of cross-sectional segments 500 determined, for example, based on the media being used to generate the physical object and the dimensions of the physical object from the model 400. As shown in FIG. 5, the cross-sectional segments 500 can segment the model such that portions of the colored panels 402, 404, and 406 are divided across the cross-sectional segments. The slicing unit 112 can retain the color information associated with the cross-sectional segments. For example, a cross-sectional segment 510 includes portions of colored panels 402 and 404 and cross-sectional segment 550 can include portions of colored panels 402 and 406.

Figure 6:
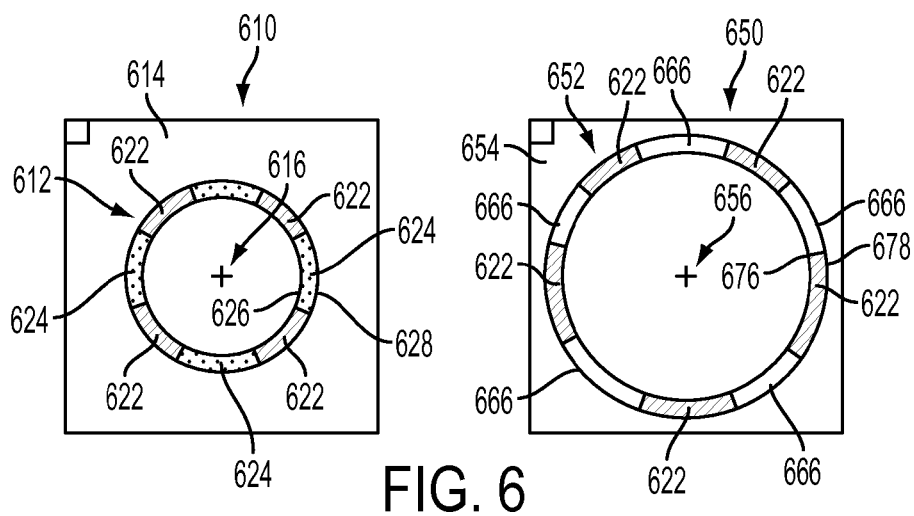
FIG. 6 illustrates exemplary page images that can be generated using the cross-sectional segments shown in FIG. 5.

FIG. 6 illustrates exemplary page images 610 and 650 that can be generated using the cross-sectional segments 510 and 550 illustrated in FIG. 5. The page image 610 can include a plan image 612 of the cross-sectional segment 510 disposed on a background layer 614. Each cross-sectional segment can have a corresponding page image. The plan image 612 can be centered about an alignment marker 616, which in the present embodiment corresponds to a central axis of the object to be formed. The plan image 612 can include color sections 622 and 624 corresponding to the colors of the panels 402 and 404. The plan image can have an inner perimeter 626 and an outer perimeter 628 forming a space within which the color sections 622 and 624 are formed. The space between the inner perimeter 626 and the outer perimeter 628 can be formed to provide an area to reveal the colors of the plan image when page image is printed and trimmed.

Likewise the page image 650 can include a plan image 652 of the cross-sectional segment 550 disposed on a background layer 654. The plan image 652 can be centered about an alignment marker 656, which in the present embodiment corresponds to a central axis of the object to be formed. The plan image 652 can include color sections 622 and 666 corresponding to the colors of the panels 402 and 406. The plan image can have an inner perimeter 676 and an outer perimeter 678 forming a space within which the color sections 622 and 666 are formed. The space between the inner perimeter 676 and the outer perimeter 678 can be formed to provide an area to reveal the colors of the plan image when the page image is printed and trimmed along a trim path associated with the plan image.

Figure 7:
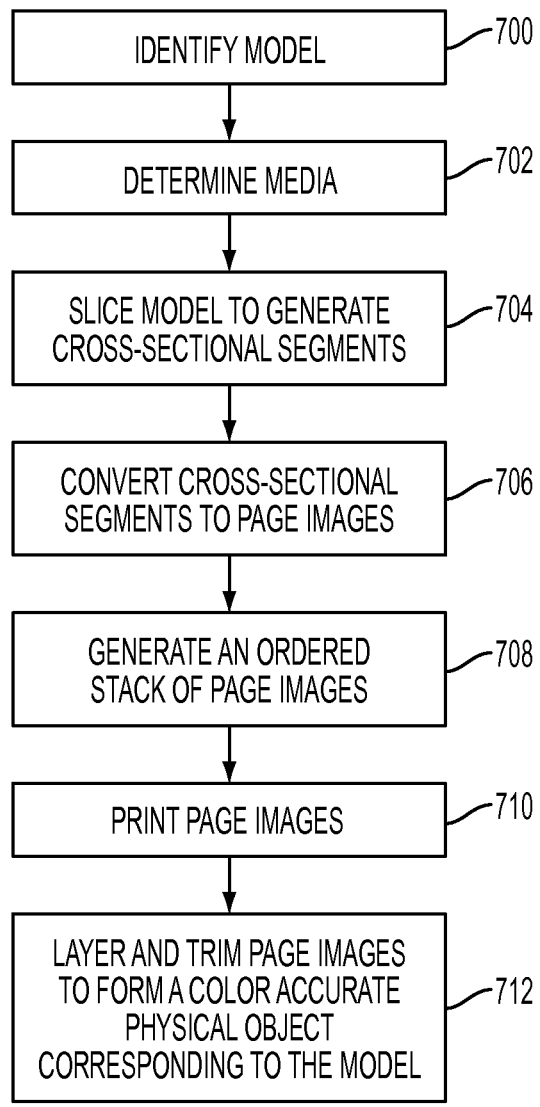
FIG. 7 is a flowchart illustrating an exemplary object generation process implement by an embodiment of a color-enabled three-dimensional (3D) object generation system.

FIG. 7 is a flowchart illustrating an exemplary object generation process implemented by an embodiment of the color-enabled three-dimensional (3D) object generation system. A 3D model for which a physical object or prototype is to be generated is identified (700) and the media on with which the physical object will be generated is determined (702). The model is sliced into a number of cross-sectional segments by the slicing unit of the decomposition system based on at least one dimension of the physical object to be generated and/or the media being used to generate the physical object (704). Color information is retained for each cross-sectional segment. The cross-sectional segments of the model are converted into page images by flattening the 3D sectional segments into 2D plan images disposed on a background layer by a page image generator (706). The plan images include colors corresponding to the colors on a perimeter surface of the cross-sectional segments that the plan images represent. The plan images can include inner and outer boundaries or perimeters that straddle the outline at which the plan images will be trimmed so that the colors extend on each side of the trim line.

An ordered stack of page images is generated corresponding to an order in which the page images are to be printed by the page image generator (708) and the page images are printed by a printing system (710). The page images are layered and trimmed to shape by cutting the cross-sectional prints along the trim line, which reveals colors of the plan images corresponding to colors on a surface of the model from which the physical object is generated (712).

It will be appreciated that various embodiments of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A method for forming a color-accurate physical object from a three-dimensional (3D) computer-based model comprising:
forming page images for a 3D computer-based model, the page images corresponding to cross-sectional segments of the 3D computer-based model, the 3D computer-based model including an image color that is different than a media color to be used to form the physical object;
printing the page images on sheets of substrate media to form a plurality of printed documents;
each printed document having the image color printed thereon based on a location of the image color in the 3D computer-based model, wherein each printed document comprises an inner perimeter and outer perimeter, the image color based on the location of the color in the 3D computer-based model being printed between the inner and outer perimeter to form a band of printed color so that interior portions of the printed documents that will not be visible when the physical object is formed do not include printed color; trimming the printed documents along a trim path between the inner and outer perimeters in the band of printed color so that the printed color on the document is revealed along the trim path; and stacking the printed documents to form the color accurate physical object.

2. The method of claim 1, further comprising:
slicing the 3D computer-based model into the cross-sectional segments based on a dimension of the physical object to be generated from the 3D computer-based model and the thickness of the sheet of substrate media used to generate the physical object.

3. The method of claim 2, wherein slicing the 3D model further comprises:
identifying a dimension of the physical object;
identifying the substrate media being used to form the physical model; and
determining a quantity of the substrate media necessary to form a stack with a height determined by the dimension of the physical object and the substrate media being used to form the physical model.

4. The method of claim 3, wherein slicing the 3D model further comprises:
slicing the 3D computer-based model into the cross-sectional segments based on the quantity of substrate media necessary to form the stack.

5. The method of claim 1, wherein forming the page images further comprises:
converting the cross-sectional segments from 3D model segments to two-dimensional (2D) plan images.

6. The method of claim 5, wherein forming the printed documents from the page images further comprises:
printing the plan images on one of paper, film and plastic; and
aligning the printed plan images so that when the plan images are trimmed and stacked, the stacked plan images form a physical object replicating the 3D computer-based model of the object.

7. The method of claim 1, wherein the printed documents are printed on both a top and bottom surface of the sheet of substrate media.

8. The method of claim 7, further comprising:
printing the page images on the sheets of substrate media to form cross-sectional prints, the image color being printed on at least one of the cross-sectional prints.

9. The method of claim 1,
wherein adjacent printed documents in the stack are operatively coupled and wherein the sheet of substrate media comprises one of paper, firm and plastic.

10. A system for forming a physical object from a three-dimensional (3D) computer-based model, the system comprising:
a processing device configured to form page images for a 3D computer-based model and to incorporate an image color into the page images based on a location of the image color in the model, the page images corresponding to cross-sectional segments of the 3D computer-based model, the 3D computer-based model including the image color that is different than a sheet of substrate media color to be used to form the physical object; and
a media printing system which prints the page images on both a top and bottom surface of the sheet of substrate media to form cross-sectional prints, the cross-sectional printed sheets of substrate media being stacked to form the color-accurate physical object; wherein the processing device is configured to form an inner perimeter and an outer perimeter for each plan image, a trim path being between the inner perimeter and outer perimeter, at least one of the plan images including the image color printed on the substrate media between the inner and outer perimeters based on the location of the color in the 3D computer-based model to form a band of printed color so that the interior portions of the cross-sectional prints that are not visible when the object is formed do not include printed color, and wherein trimming the at least one of the plan images along the trim path reveals the printed color on an edge of the substrate media.

11. The system of claim 10, wherein the processing device is configured to slice the 3D computer-based model into the cross-sectional segments based on a dimension of the physical object to be generated from the 3D computer-based model and the thickness of the substrate media used to generate the physical object, and wherein the sheet of substrate media comprises one of paper, film and plastic.

12. The system of claim 11, wherein the processing device is configured to convert the cross-sectional segments from 3D model segments to two-dimensional plan images.

13. The system of claim 12, wherein the processor is configured to print the plan images and align the printed plan images so that when the plan images are stacked, the plan images form a physical object which replicates the 3D computer-based model of the object.

14. The system of claim 10, further comprising:
a 3D printing system adapted to layer the cross-sectional prints to form the stack and trim the cross-sectional prints along the trim path of the plan images printed on the cross-sectional prints to shape the cross-sectional prints to form the physical object, adjacent cross-sectional prints in the stack being operatively coupled by the 3D printing system, the cross-sectional prints being trimmed to reveal the image color so that the physical object formed from the cross-sectional prints represents a color accurate rendering of the 3D computer-based model.

15. A non-transitory computer readable medium storing instructions executable by a processing device, wherein execution of the instructions implements a method for forming a physical object from a three-dimensional (3D) computer-based model comprising:
forming page images for a 3D computer-based model, the page images corresponding to cross-sectional segments of the 3D computer-based model, the model including an image color that is different than a substrate media color to be used to form the physical object; and incorporating the image color into the page images based on a location of the image color in the 3D computer-based model, the image color of the page images being printed on sheets of substrate media to form cross-sectional prints from which the physical object is formed, wherein each cross-sectional print comprises an inner and outer perimeter, the image color based on the location of the color in the 3D computer-based model being printed on the substrate media between the inner and outer perimeter to form a band of printed color so that interior portions of the cross-sectional prints that are not visible when the physical object is formed do not include printed color, and a trim path being between the inner and outer perimeters so that upon trimming the sheet of substrate media, the printed color is revealed along the trim path on an edge of the substrate media.

16. The medium of claim 15, wherein the method implemented by execution of the instructions further comprises:

converting the cross-sectional segments from 3D model segments to two-dimensional plan images;

printing the plan images on the sheets of substrate media; and aligning the printed plan images so that when the plan images are trimmed and stacked, the stacked plan images form a physical object which replicates the 3D computer-based model.

17. The medium of claim 15, wherein the method implemented by execution of the instructions further comprises:

printing on both a top and bottom surface of the sheet of substrate media to form the cross-sectional prints.

18. The medium of claim 15, wherein the method implemented by execution of the instructions further comprises:

printing the page images on one of paper, film and plastic.

19. The medium of claim 15, wherein the method implemented by execution of the instructions further comprises:

layering the cross-sectional prints to form a stack, adjacent cross-sectional prints in the stack being operatively coupled; and trimming the cross-sectional prints along the trim path of the plan images printed on the cross-sectional prints to shape the cross-sectional prints to form the physical object, the cross-sectional prints being trimmed to reveal the image color so that the physical object formed from the cross-sectional prints represents a color accurate rendering of the 3D computer-based model.

* * * * *